O. HUSSEY.

Harvester Cutting Apparatus.

No. 917. Reissued Feb. 28, 1860.

N. PETERS, Photo-Lithographer, Washington, D. C.

UNITED STATES PATENT OFFICE.

OBED HUSSEY, OF BALTIMORE, MARYLAND.

IMPROVEMENT IN REAPING-MACHINES.

Specification forming part of Letters Patent No. 5,227, dated August 7, 1847; Reissue No. 450, dated April 14, 1857; Reissue No. 743, dated June 21, 1859; Reissue No. 917, dated February 28, 1860.

*To all whom it may concern:*

Be it known that I, OBED HUSSEY, of the city and county of Baltimore, in the State of Maryland, have invented a new and useful improvement in the cutting apparatus of reaping machines for cutting all kinds of small grain and grasses, the special object of the improvement which is the subject of this patent being the cutting of grass or mowing.

Figure 1:
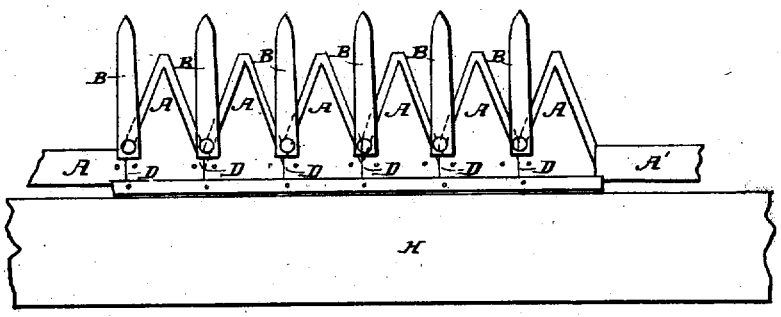

Figure 1 is a bird's-eye view of the cutting apparatus, in which A A A A A A represent angular blades, and A′ A′ the bar or stock of a rectilinear vibrating sickle, the blades being riveted or otherwise secured to the stock, and so constructed and arranged that their cutting-edges form a zigzag or scalloped line. B B B B B B represent the permanent guard-irons or fingers. H represents the finger-beam, or beam to which the fingers are attached, and which carries and supports them and the cutter. The guards or fingers are formed of a lower part and an upper part, between which the blades pass and repass in cutting, so that the grass or other material which comes in between the guards to be cut is firmly supported both above and below the vibrating blades. In my improved combination the lower and upper parts of the guard or finger, between which is the slot for the cutter to play through, instead of surrounding the slot are so constructed and arranged as to leave an opening out of the slot through which clogging matter may escape.

Figure 2:
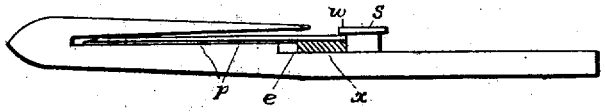

Fig. 2 of the drawings represents one of the guards or fingers, the cutter, and the confining ways or guides for holding the cutter securely in the open slotted finger. As one convenient way of holding the cutter, I have arranged the bar A′, to which the blades are attached, to travel in guides *e s x*, while the blades on the side opposite to the bar are held by a guide, W, against which they bear. It is obvious that the guide *e*, merely as such, need not necessarily be a bar, as shoulders on the fingers, as seen in Fig. 1, would perform this function.

Figure 3:
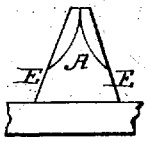

Fig. 3 represents a portion of the stock or bar A′, to which the blades or sections of the cutter are attached, and one of the blades or sections, having its edges E E flushed on each side of and at the fork of the blade, the cutting-edge in front of the flush being beveled on both sides, or having the flush taken off enough to prevent it from cutting into the corners of the fingers as it vibrates across the same.

In the organized cutting apparatus which constitutes the subject-matter of this patent it is essential that the fingers be made so short and with so little projection below the cutter as to permit the edge of the cutter to vibrate as near the ground as the smaller grasses are usually cut. This distance is sometimes required to be about and even less than one inch. I find fingers which project about five inches in front of the finger-beam to answer well. They cannot without considerable disadvantage be increased to twelve inches, and they may be made less than five inches long without material disadvantage, if they are not set more than from two and a half to four inches apart and the cutter does not project too far forward. For the reason above stated I make the projection of the finger below the edge of the cutter not to exceed an inch. It is also essential that the fingers be made stiff, and that each of them should have on each side a durable angular shearing-corner, either at the top or bottom of the slot. To obtain this stiffness without increasing their size injuriously, the fingers must be made of hard and strong metal. I prefer iron. The cutter must also be made with a portion of the cutting-edges of each blade or scallop flushed on one side, and the cutter must be so inserted and vibrated in the slots of the fingers that the cutting-edges of the scallops shall pass in close proximity to the angular shearing-corners of the fingers. The stiffness, durability, and angularity of the fingers, in conjunction with the flushing and proximate position of the vibrating cutting-blades, as above mentioned, and as seen in one form in the drawings, are necessary to produce the shearing action which is essential to the efficiency of the present organization. It is also essential (and much more so when the cutting-edge is smooth than when it is sickled) to preserve this relative position of the edge of the blades to the shearing-corners of the fingers during the vibration of the cutter, and this is effected by means of a suitable guide or guides. If the guides were placed only at the extremities of the cutter or at long intervals, the cutting-edges of the blades and fingers would not preserve the proximity requisite to full shearing action, especially with smooth-edge scallops. It is important, also, that the cutter vibrate in a straight line, which result is also secured by the guides. The angle which the edges of the scallops or blades make with the sides of the finger is also an important feature in this organization. In cutting the smaller grasses they are not held against the edges of the cutter by reason of the stiffness of their own stalks and the firmness with which they stand on the ground, as is the case with wheat and other grain, and on account of this want of stiffness, as well as because of the shortness of such grasses, a reel or other mechanical apparatus to press the grass back against the cutter's edge cannot be advantageously employed. This angle should therefore be such as to insure a complete shearing action between the angular corners of the fingers and the flush portions of the edges of the blades by the mere sliding of the latter over the former; or, in other words, this angle should be such that the grass will be nipped or pinched and held until it is cut by the mere action of the approximate edge of the cutter across the corner of the finger. I find about twenty-five degrees to be a good angle for nipping and clipping, or, in other words, for a complete shearing action with an unsickled cutting-edge. This angle between the finger and the edge of the blade may be diminished slightly, but without any advantage, and to diminish it much would be highly disadvantageous. The angle may be increased to forty-five degrees and retain sufficient nipping effect, and it may even be increased to sixty degrees, but with a diminished effect, and it is obvious that for a smooth edge the angle must be less than would answer for a sickled edge, as the latter is rougher, and its teeth or serrations help to grasp and hold the stalks and prevent them from being pushed from between the blade and finger before being severed. The important point is to make this angle sufficiently acute to secure the nipping, which, as above stated, is essential to full shearing action. In cutting the smaller grasses it is further important that the cut grass be deposited, as fast as cut, upon the ground behind the cutting apparatus. Hence in the present organization I employ no platform, but only a beam for carrying the fingers and cutter, over which the cut grass will, it is obvious, readily fall upon the ground. The narrower this beam is made consistent with sufficient strength the better. I have usually made it of white oak, from five to seven inches wide and from one and a half to two inches thick, and have found these proportions to answer very well in the "Hussey" mower. If made of different materials or placed in other machines, subjected to different strains, the proportion would have to be correspondingly varied. A beam (without any platform) only sufficient to carry and support the fingers and cutter is an important element in the adaptation of the mowing-machine to cut to the best advantage fine as well as coarse grass and on uneven as well as on even ground.

What I claim under this patent as my invention is—

The combination of the finger-beam, (without a platform,) the short open-slot fingers having small projection below the cutter, the scalloped cutter, and the guides for the cutter, these parts being constructed and combined substantially as described, the cutter vibrating in a straight line, each scallop having an edge sliding in close proximity to an angular corner of the finger and forming therewith a nipping-angle, substantially as described.

In testimony whereof I have hereunto subscribed my name.

OBED HUSSEY.

Witnesses:

P. H. WATSON,

W. RENWICK SMEDBERG.